US012105711B2

(12) United States Patent
Gjerdrum et al.

(10) Patent No.: US 12,105,711 B2
(45) Date of Patent: Oct. 1, 2024

(54) COMPUTING RESOURCE CONSERVATION WITH BALANCED TRAVERSALS AND PRECOMPUTATIONS FOR CONNECTED DATA SETS

(71) Applicant: Microsoft Technology Licensing, LLC, Redmond, WA (US)

(72) Inventors: Anders Tungeland Gjerdrum, Tromso (NO); Tor Kreutzer, Tromso (NO); Jan-Ove Karlberg, Tromso (NO)

(73) Assignee: Microsoft Technology Licensing, LLC., Redmond, WA (US)

( * ) Notice: Subject to any disclaimer, the term of this patent is extended or adjusted under 35 U.S.C. 154(b) by 254 days.

(21) Appl. No.: 17/847,146

(22) Filed: Jun. 22, 2022

(65) Prior Publication Data
US 2023/0418821 A1     Dec. 28, 2023

(51) Int. Cl.
*G06F 21/00*     (2013.01)
*G06F 16/2453*     (2019.01)
(Continued)

(52) U.S. Cl.
CPC .... *G06F 16/24545* (2019.01); *G06F 16/9024* (2019.01); *G06F 16/9027* (2019.01); *G06F 21/6218* (2013.01)

(58) Field of Classification Search
CPC .......... G06F 16/24545; G06F 16/9024; G06F 16/9027; G06F 21/6218; G06F 16/245; G06F 21/604
See application file for complete search history.

(56) References Cited

U.S. PATENT DOCUMENTS 8,504,733 B1    8/2013   Iyer et al.
9,189,567 B1   11/2015   Goldman et al.
(Continued)

FOREIGN PATENT DOCUMENTS

| CN | 104090962 B | 3/2017 |
| CN | 108460102 A | 8/2018 |
| WO | 2018156671 A1 | 8/2018 |

OTHER PUBLICATIONS

"International Search Report and Written Opinion Issued in PCT Application No. PCT/US23/021107", Mailed Date: Aug. 14, 2023, 12 Pages.
(Continued)

*Primary Examiner* — Mahfuzur Rahman
(74) *Attorney, Agent, or Firm* — Barta Jones, PLLC

(57) ABSTRACT

Example solutions balance traversals and precomputations for connected data sets subject to access control. When a request for a commutative operation on a connected data set is received, a downwardly recursive process starts with the current hierarchy tier set to a highest hierarchy tier of the request. The process traverses the current hierarchy tier laterally. At each discovered node in the current hierarchy tier, a determination is made whether the requested operation is permitted to include a discovered node. If not, that node and any nodes hierarchically below it are omitted from the operation. That node and its subtree are skipped and the recursion halts for that branch. If, however, the requested operation is permitted to include the node, it is incorporated into the cumulative result and the recursion continues while there remains a lower hierarchy tier. Some examples leverage precomputed aggregates to avoid traversing branches having aggregates.

20 Claims, 12 Drawing Sheets

(51) Int. Cl.
    *G06F 16/901*     (2019.01)
    *G06F 21/62*     (2013.01)

(56) References Cited

U.S. PATENT DOCUMENTS

| | | | |
|---|---|---|---|
| 9,286,245 B2* | 3/2016 | Durham | G06F 21/50 |
| 11,048,699 B1 | 6/2021 | Grider et al. | |
| 11,544,400 B2* | 1/2023 | Hind | G06F 16/9535 |
| 2010/0079460 A1 | 4/2010 | Breeds et al. | |
| 2013/0246454 A1 | 9/2013 | Menten et al. | |
| 2018/0173760 A1 | 6/2018 | Viken Valvåg et al. | |
| 2021/0226951 A1* | 7/2021 | Goldstein | H04L 63/107 |
| 2021/0286793 A1 | 9/2021 | Okeeffe et al. | |
| 2021/0289001 A1* | 9/2021 | Wilson | H04L 63/101 |
| 2022/0148016 A1 | 5/2022 | Fang et al. | |
| 2023/0418821 A1* | 12/2023 | Gjerdrum | G06F 16/9027 |

OTHER PUBLICATIONS

"Graph Traversal", Retrieved from: http://web.archive.org/web/20210613025757/https:/solr.apache.org/guide/7_4/graph-traversal.html, Jun. 13, 2021, 17 Pages.

Beldiceanu, et al., "Graph Properties Based Filtering", In Proceedings of the International Conference on Principles and Practice of Constraint Programming, May 4, 2006, 31 Pages.

Fan, et al., "Rewriting Regular XPath Queries on XML Views", In Proceedings of the IEEE 23rd International Conference on Data Engineering, Apr. 15, 2007, 10 Pages.

* cited by examiner

COMPUTING RESOURCE CONSERVATION WITH BALANCED TRAVERSALS AND PRECOMPUTATIONS FOR CONNECTED DATA SETS

BACKGROUND

A connected data set, such as a graph database (e.g., property graph) uses a node/edge architecture, storing data entities in nodes and relationships between nodes in edges. A graph database provides value, in part, by enabling users to identify a set of nodes based on relationships among the nodes, rather than merely based on properties of the nodes themselves. Some graph databases are acyclic, and some have tree structures with hierarchy tiers. In some scenarios, a graph database may be distributed among storage locations that span different geographical regions.

When a data set is subject to access control, there may be policy-dependent views. When a user (e.g., a viewer) attempts to access some portion of the data set with a query to perform a commutative operation on the nodes (e.g., count, sum, collect, union, intersection, average, percentiles, minimum, or maximum), existing solutions for determining whether the viewer is permitted to access any particular discovered node in the data set, and include that node in the operation, are deficient. In one solution, for each discovered node, the viewer's permission is checked. However, checking each node at query time slows down the operation, increases latency, and consumes significant computing resources, for a distrusted data set. In another solution, precomputed aggregates are created for each potential viewer. However, using precomputed aggregates becomes expensive for storage when the data set and/or number of potential viewers is large, at least due to factorial-rate growth.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Example solutions for balancing traversals and precomputations for connected data sets include: receiving a request for a commutative operation on a connected data set, the data set subject to access control; starting with a current hierarchy tier set to a highest hierarchy tier of the request, determining a cumulative result of the operation, wherein determining the cumulative result comprises recursively: traversing the current hierarchy tier laterally and, at each discovered node in the current hierarchy tier: based on at least a set filter of the discovered node indicating that the request is not permitted for the discovered node, omitting any nodes hierarchically below the discovered node from the recursion; and based on at least the set filter of the discovered node indicating that the request is permitted for the discovered node: including the discovered node in the cumulative result; and continuing the recursion to any new current hierarchy tier below the discovered node.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

Example solutions described herein provide computing resource conservation with balanced traversals and precomputations for connected data sets that are subject to access control. When a request for a commutative operation on a connected data set is received, a downwardly recursive process starts with the current hierarchy tier set to a highest hierarchy tier of the request. The process traverses the current hierarchy tier laterally. At each discovered node in the current hierarchy tier, a determination is made whether the requested operation is permitted to include a discovered node. If not, that node and any nodes hierarchically below it are omitted from the operation. That node and its subtree are skipped and the recursion halts for that branch. If, however, the requested operation is permitted to include the node, it is incorporated into the cumulative result and the recursion continues while there remains a lower hierarchy tier. Some examples also leverage precomputed aggregates to avoid traversing branches having aggregates, providing further computational efficiency.

Aspects of the disclosure improve the operations of computing devices, for example, improving the efficiency of computing resources for data queries in connected data sets, at least in part by, based on at least a set filter of a discovered node indicating that a request is not permitted for the discovered node, omitting any nodes hierarchically below the discovered node from a recursion. This precludes traversing portions of the data set. In some examples, avoiding traversing a portion of the data set may be triggered by a precomputed aggregate representing a discovered node and its subtree (e.g., rendering traversing the subtree unnecessary) in addition to leveraging the set filter to efficiently indicate that a discovered node and its subtree are outside the viewer's permissions (e.g., avoiding traversing a subtree that is off-limits).

By foregoing traversing a node's subtree (e.g., either because it is off-limits or a precomputed aggregate is used instead of traversal), the requested operation is performed more rapidly and with fewer computing resources. Additionally, by limiting the count of precomputed aggregates to a smaller set (as described below), the computing storage burden of the precomputed aggregates may be significantly lessened. This improves management of the computing resources, including their allocation.

Figure 1A:
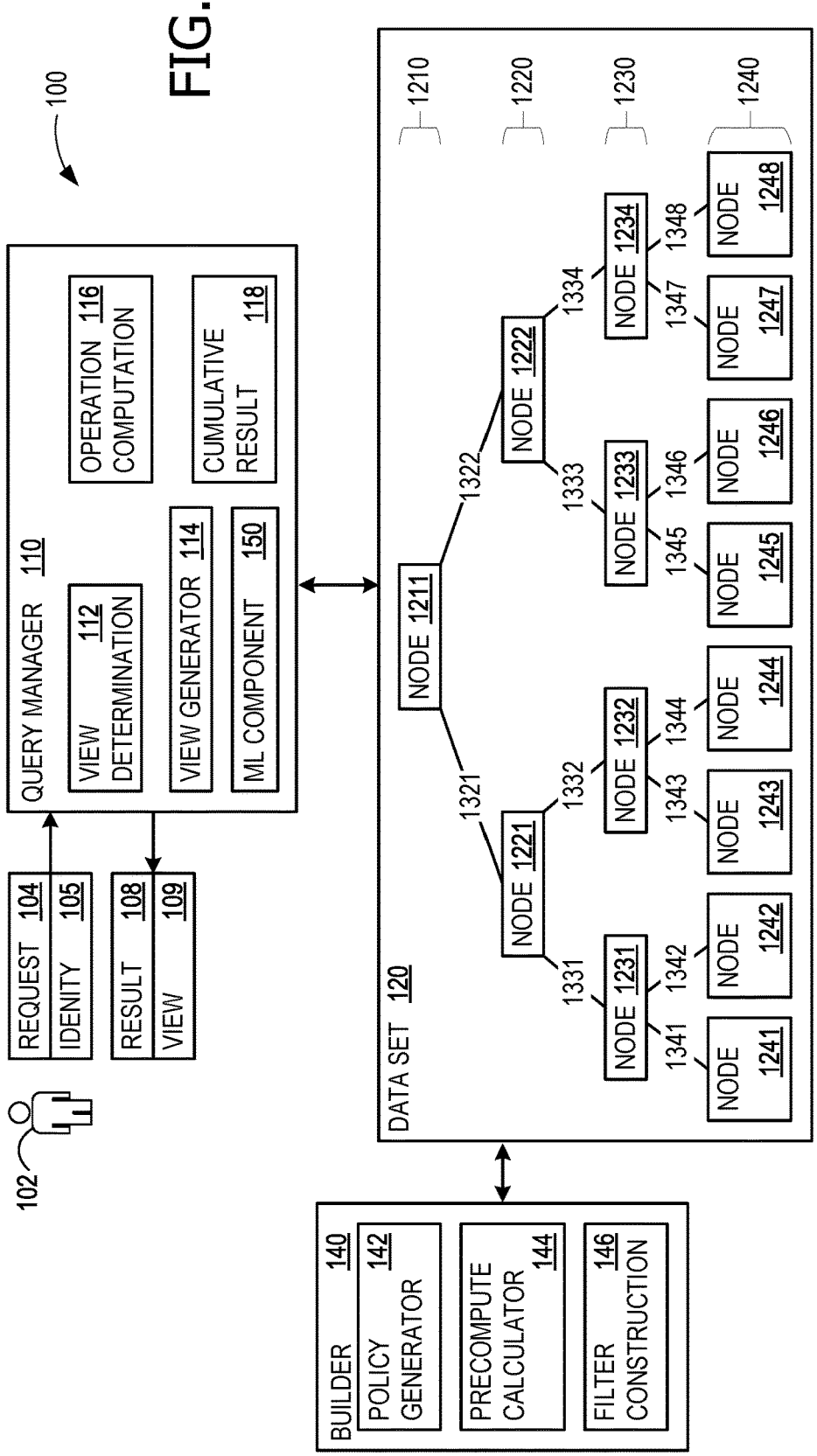
FIG. 1A illustrates an example architecture that advantageously balances traversals and precomputations for connected data sets.

FIG. 1A illustrates an example architecture 100 that advantageously balances traversals and precomputations for distributed data sets. A viewer 102 (e.g., user) submits a request 104 for a commutative operation on a connected data set 120. A query manager 110 manages traversal of data set 120 while compiling a cumulative result 118, and reports a final result 108 (e.g., based on at least cumulative result 118) to viewer 102. In some examples, data set 120 that may be separated (distributed) across a plurality of different regions (e.g., different geographic regions—see FIG. 2) such that latency when traversing data set 120 affects performance and user experience. Minimizing traversals of data set 120 is thus desirable, when practical.

In some examples, data set 120 comprises an acyclic graph with nodes (e.g., data entities) and relationships (e.g., edges) among nodes, forming a tree structure. Whereas a connected acyclic graph is a tree, an acyclic graph having disparate sets of connections is a forest. As shown, data set 120 has nodes 1211-1244 and relationships 1331-1348. In some examples, data set 120 comprises a relational database. Some examples use other types of data that may be queried, such as a data set having links or references among nodes. In some examples, each node and each relationship may have a unique global identifier.

An example use case is access control for an academic institution's contact list. In such an example, data set 120 comprises the contact list. Faculty members and administrators may have access to information for other faculty members and administrators as well as student information, whereas students may have access to only information for only a select set of faculty members and administrators but no access to student information (or limited access to some student information).

Another example use case is access control for a document revision history database for a company's proprietary documents. In such an example, data set 120 comprises the document revision history database. Each manager in the company is permitted to see document revision histories for revisions by that manager's subordinates (e.g., company employees within the manager's group), but not by subordinates of that manager's peers (e.g., other managers at the same hierarchy level) or by higher-tier employees. In this example, another data set 120 may comprise the company's organization chart, and a commutative operation may be counting the number of employees under a certain group manager.

In both of the above examples, access is limited by who is viewing, thereby limiting the nodes of data set 120 that may be included in any operation requested by the viewer. Examples of request 104 (e.g., in natural language form), which trigger commutative operations, are "How many students are in Instructor X's classes?" and "How many document revisions have been performed by the Sales group?" In some examples, viewing limitations carry over to limitations on which nodes may be included in the calculations of commutative operations.

Aspects of the disclosure are not limited to the use cases described above. For example, aspects of the disclosure are also operable to traverse any data set to identify a condition in a human or animal body, and perform an intervention on the body. This use case can further be dependent on medical scans or images, questionnaire data, and/or the like. This use case could also be limited to a human application, or specifically to identifying an illness as opposed to just a condition.

Some use cases contemplate image recognition applications, and other use cases can detect a state of a device based on readings. In the latter, the input data may comprise one or more sensor readings from a device or state of a software application, and the data set may be traversed for input to a machine learning program to predict an action to perform on the device or software application, such as debugging, updates, maintenance, and the like.

Query manager 110 handles viewing limitations (and the resulting limitations on what may be included in calculations of commutative operations) using an identity 105 of viewer 102. Identity 105 is associated with request 104 and passed to a view determination 112 of query manager 110 which uses set filters and policies (shown in FIG. 1B) for various nodes to determine whether viewer 102 has permission to view various discovered nodes. In some examples, set filters and policies associated with relationships are also used to limit viewing access.

If viewer 102 desires to view portions of data set 120, in addition to performing a commutative operation, query manager 110 determines the extent of the permissible view for viewer 102 using identity 105 and view determination 112, and uses a view generator 114 to generate a view 109 for presentation to viewer 102. An operation computation 116 performs the actual calculations of requested commutative operations, adding in precomputed aggregates (if any are encountered) with the data from each discovered node that viewer 102 is permitted to view. Final result 108 may be a copy of cumulative result 118, or may be further filtered and/or otherwise processed prior to reporting to viewer 102.

Data set 120 is illustrated with 15 nodes stratified into four tiers and connected in a tree structure using 14 relationships, although it should be understood that examples may use a significantly larger number of nodes, relationships, and tiers in a more complex arrangement. As illustrated, data set has a single node 1211 at a highest tier 1210. A relationship 1321 connects node 1211 to node 1221 in a tier 1210, and a relationship 1322 connects node 1211 to node 1222, also in tier 1210. Moving to a next lower tier 1230, a relationship 1331 connects node 1221 to node 1231; a relationship 1332 connects node 1221 to node 1232; a relationship 1333 connects node 1222 to node 1233; and a relationship 1334 connects node 1222 to node 1234. Moving to lowest tier 1240, a relationship 1341 connects node 1231 to node 1241; a relationship 1342 connects node 1231 to node 1242; a relationship 1343 connects node 1232 to node 1243; a relationship 1344 connects node 1232 to node 1244; a relationship 1345 connects node 1233 to node 1245; a relationship 1346 connects node 1233 to node 1246; a relationship 1347 connects node 1234 to node 1247; and a relationship 1348 connects node 1234 to node 1248.

Figure 1B:
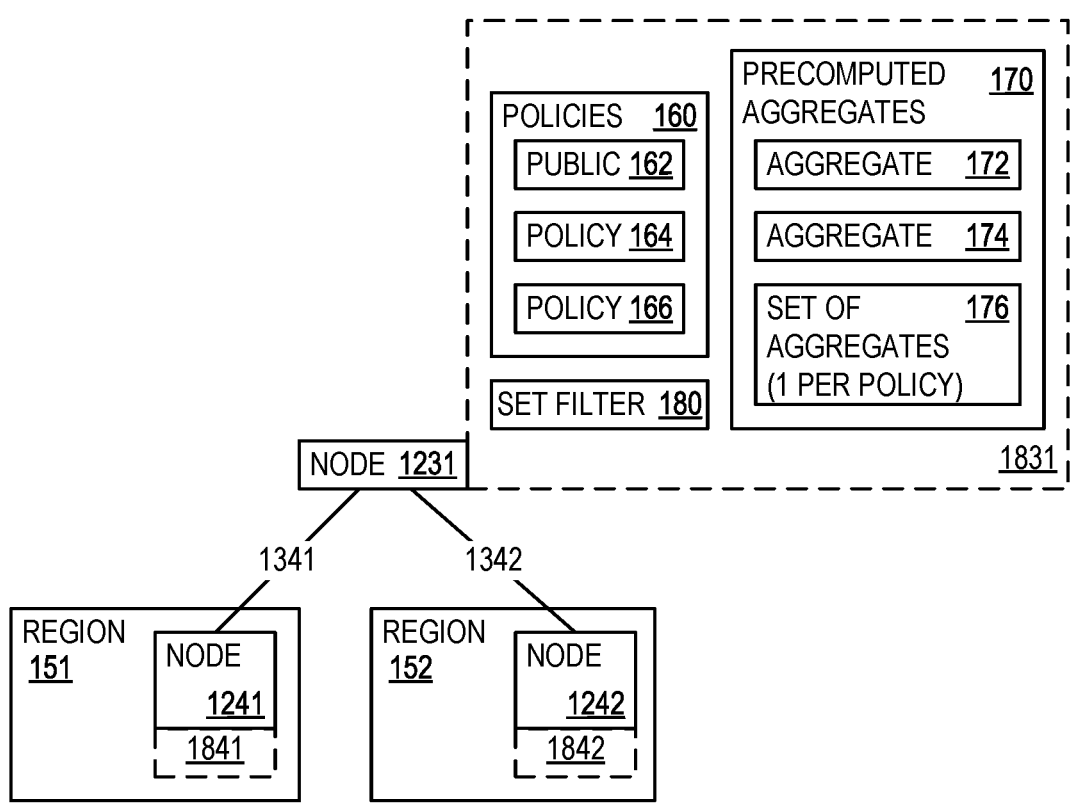
FIG. 1B illustrates further detail for the data set of FIG. 1A.

A builder 140 builds out data for the nodes within data set 120. Further detail is shown in FIG. 1B for the data for the nodes within data set 120. With reference now to both FIGS. 1A and 1B, traversal data 1831 is illustrated for node 1231. Other nodes within data set 120 each have their own versions of traversal data 1831, tailored to those nodes. For example, node 1241 is illustrated as having traversal data 1841, and node 1242 is illustrated as having traversal data 1842.

Traversal data 1831 has policies 160, precomputed aggregates 170, and at least one set filter 180. Policies are rules that control whether information is permitted to flow to a destination (e.g., into a view). Policies 160 identify whether viewer 102 is able to view node 131 and include data from node 1231 in various operations. Policies 160 is shown as having a public flag 162 which, if set to "public" (or an equivalent setting) indicates that node 1231 is publicly viewable. In such a situation, there is no need to check permission for request 104 specifically (e.g., using identity 105 for viewer 102).

However, if public flag 162 is set to "non-public" (or an equivalent setting), permission is checked for request 104 using specific policies. Policies 160 is shown as having two specific policies, policy 164 and policy 166. If either policy 164 or policy 166 indicates that identity 105 is able to view node 1231, then request 104 is permitted for node 1231. Otherwise, if public flag 162 is set to "non-public" and no specific policy within policies 160 indicates permission for identity 105, then request 104 is not permitted for node 1231.

Precomputed aggregates 170 are calculated by precompute calculator 144 in builder 140 (of FIG. 1A). The aggregate values may be operation results for any of count, sum, collect, union, intersection, average, percentiles, minimum, maximum, and other operations that are also commutative. The aggregates are determined when a new node is inserted into data set 120, and represent the operation values for a specific node plus the nodes hierarchically below it. For example, aggregate values in precomputed aggregates 170 are values for operations that include nodes 1231, 1241 and 1242 (plus all further nodes below nodes 1241 and 1242, if any). By using values from precomputed aggregates 170, traversal of data set below node 1231 becomes unnecessary and so may be avoided.

Two single aggregate values are illustrated, a precomputed aggregate 172 and a precomputed aggregate 174. These aggregate values are used when node 1231 is public, but will not be used when node 1231 is non-public (private). When a node (e.g., any of nodes 1211-1244) is added to data set 120, policy generator 142 generates policies 160 for the node. If policy generator 142 sets public flag 162 to "public", when precompute calculator 144 notes the setting of public flag 162, precompute calculator 144 calculates precomputed aggregate 172 and precomputed aggregate 174. However, if policy generator 142 sets public flag 162 to "non-public", when precompute calculator 144 notes the setting of public flag 162, precompute calculator 144 skips calculating precomputed aggregate 172 or precomputed aggregate 174. Precomputed aggregates 170 is also updated in each node hierarchically above a newly inserted node.

Another scenario is indicated for a case in which the available storage permits storing a set of aggregates 176 for each combination of policies at each node. Aggregate values within set of aggregates 176 are used for non-public nodes, although may be limited to scenarios in which the number of policies is relatively small (e.g., only "visible" and "not visible") such that storing set of aggregates 176 is manageable. The values in set of aggregates 176 are calculated by precompute calculator 144, similar to precomputed aggregate 172 and precomputed aggregate 174 for public nodes.

Set filter 180 provides a rapid way to determine whether a particular node and its subtree are within the permission range of viewer 102 (e.g., permitted for request 104, based on identity 105). Set filters are described in further detail in relation to FIGS. 3A-3C, and provide a rapid determination whether an element is a member of a set in a memory-efficient manner, when the set is large.

For example, set filter 180 provides a rapid determination whether identity 105 is indicated as being permitted by any specific policy within policies 160 of a particular node and all the nodes below it. The cumulative set of specific policies within policies 160 for a large subtree may become quite large, and set filter 180 provides a rapid and memory-efficient solution. Examples of set filters that may be used for set filter 180 include Bloom filters and cuckoo filters. Although some examples of set filter 180 provide reliable yes/no results, some versions of set filter 180 provide a probabilistic positive result and are definitive for only negative results. This means that a "yes" is actually a "maybe", although "no" is a solid "no".

Figure 3A:
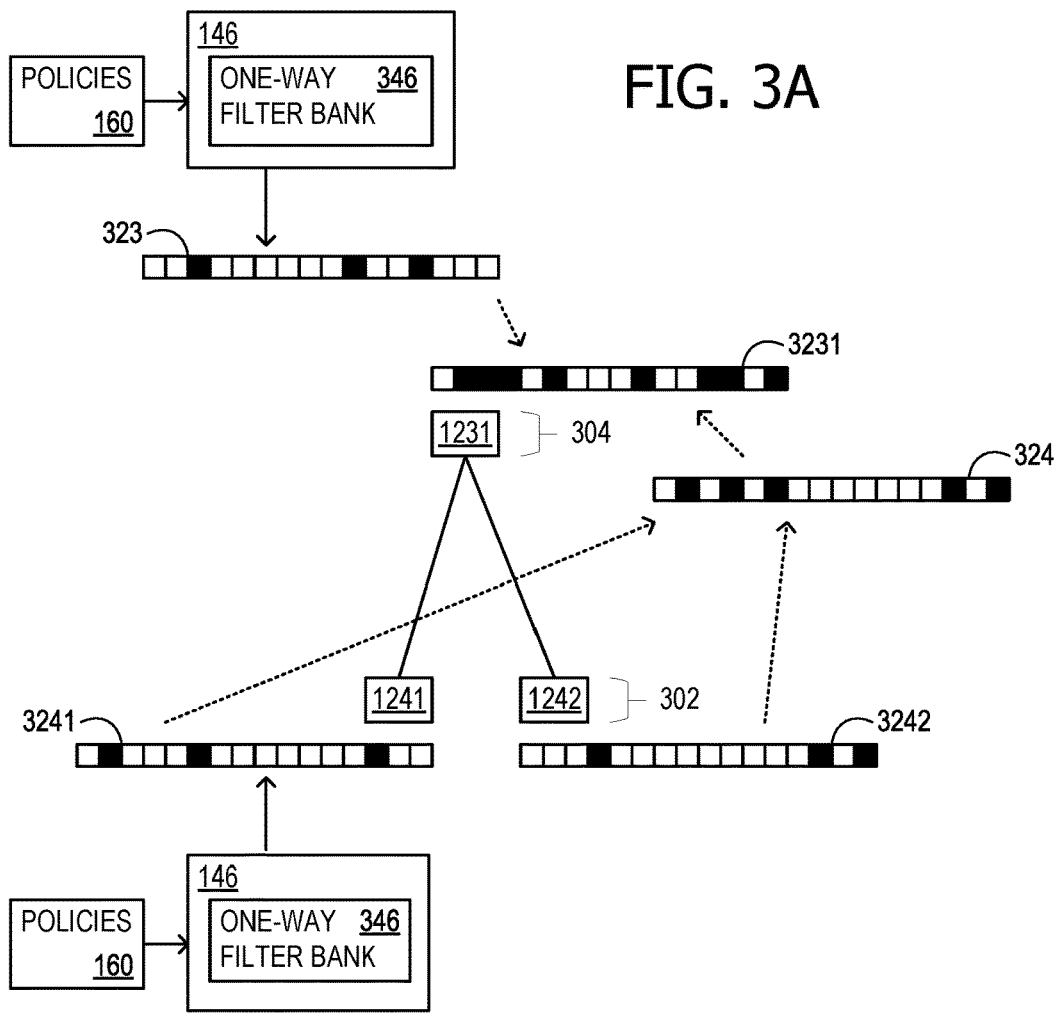
FIGS. 3A and 3B illustrate generation of set filters, as may occur with the architecture of FIG. 1.

A filter construction 146 in builder 140 builds set filter 180 for a node, using policies 160 for that node and also set filters 180 for nodes hierarchically below that node. For example, filter construction 146 builds set filter 180 for node 1231 using policy 164, policy 166, the set filters 180 of node 1241, and the set filters 180 of node 1242. One example process for building set filter 180 is shown in FIG. 3A. In some examples, set filter 180 is built for a node when the node is inserted into data set 120, but may return incorrect results when policies 160 changes.

The false positive rate of set filter 180 (for versions providing a probabilistic positive result) is generally dependent on multiple factors. For Bloom filters, parameters affecting the false positive rate include the number of bit fields used, the number of one-way functions used, and one-way function type. Larger numbers of bit fields and one-way functions reduce the false positive rate at the cost of increasing set filter size. Certain classes of one-way functions reduce collision risk (thereby also reducing the false positive rate), but at the cost of increasing filter construction time.

In some examples, ML component 150 monitors the false positives of set filter 180 for various nodes of data set (in response to requests) and determines whether a change in the number of bit fields and/or the number of one-way functions would improve performance. Loss functions used by ML component 150 may include weighted combinations of filter speed, filter-size, filter construction time, and false positive rate. In some examples, loss functions may be tailored to available storage size and target user experience. ML component 150 feeds back filter parameter changes to filter construction 146.

Also shown in FIG. 1B is that node 1241 is located within a region 151 and node 1242 is located within a region 152. In some examples, regions 151 and 152 are disparate geographic regions, meaning that data set 120 is distributed across a plurality of disparate geographic regions. The latency associated with traversing data set 120 across all of nodes 1231, 1241, and 1242 may thus be advantageously avoided in some scenarios, using architecture 100, thereby improving the computational and temporal speed of determining cumulative result 118 (and thus also final result 108).

Referring back to FIG. 1A, at least four scenarios are manifest for query manager 110 handling request 104 at node 1231:

(1) Node 1231 is public and so viewer-specific permission is not needed. The operation calculation uses a precomputed aggregate from precomputed aggregates 170. There is no need to traverse data set 120 below node 1231, and so traversal of data set below node 1231 is avoided. This provides computational and time savings over traversing data set 120 to add each node below node 1231 into cumulative result 118, individually.

(2) Node 1231 is not public and so viewer-specific permission is needed. Viewer-specific permission is indicated, and request 104 is permitted. Set of aggregates 176 is not available. The operation calculation uses data from node 1231 and needs to traverse data set 120 to include data from any further nodes below node 1231 in cumulative result 118.

(3) Node 1231 is not public and so viewer-specific permission is needed. Viewer-specific permission is indicated, and request 104 is permitted. Set of aggregates 176 is available. The operation calculation uses data from set of aggregates 176. There is no need to traverse data set 120 below node 1231, and so traversal of data set below node 1231 is avoided. This provides computing resource savings (e.g., memory, processing, and/or bandwidth) and time savings over traversing data set 120 to add each node below node 1231 into cumulative result 118, individually.

(4) Node 1231 is not public and so viewer-specific permission is needed. However, viewer-specific permission is not indicated, and so request 104 is not permitted. The operation calculation does not use data from node 1231 or any nodes below node 1231 in cumulative result 118. There is no need to traverse data set 120 below node 1231 (because the lack of permission is already known for the entire subtree), and so traversal of data set below node 1231 is avoided. This provides time savings over traversing data set 120 to check permission for each node below node 1231, individually.

Figure 2A:
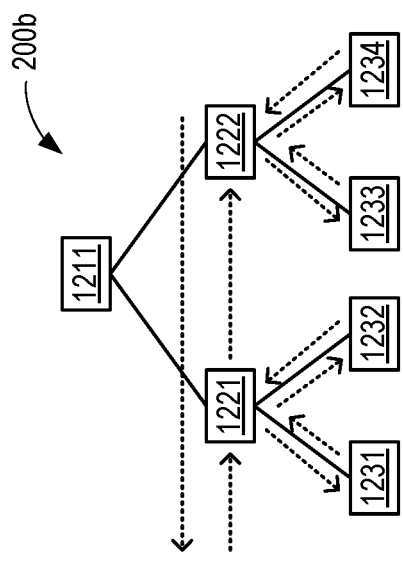
FIG. 2A-2C illustrates various traversal scenarios for a connected data set, as may occur with the architecture of FIG. 1.
Figure 2B:
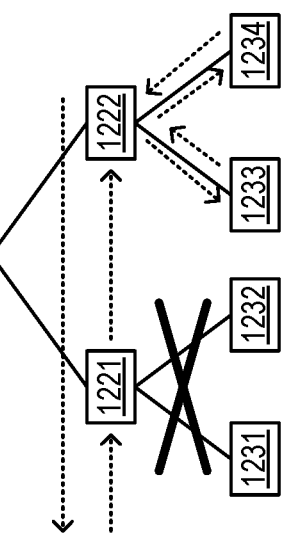
Figure 2C:
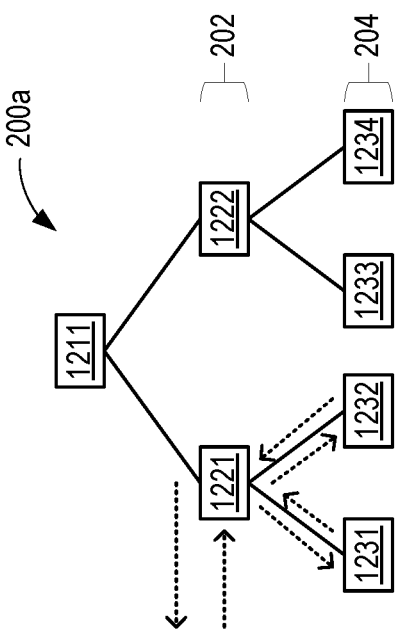

FIGS. 2A-2C illustrate various traversal scenarios for data set 120. FIG. 2A illustrates a traversal scenario 200a in which traversal at the highest hierarchy tier of request 104 is limited to a single node, such as the node indicated in request 104. For example, request 104 may be to count all employees reporting to a manager that is represented by node 1221. Traversal of data set 120 is indicated by the dotted line in FIG. 2A. Starting with the current hierarchy tier set to a highest hierarchy tier of request 104 (e.g., starting with current hierarchy tier set to hierarchy tier 202), node 1221 is discovered first. Query manager 110 (e.g., using view determination 112) determines that request 104 is permitted for node 1221 and its subtree (e.g., nodes 1231 and 1332 hierarchically below node 1221).

The traversal proceeds downward to the next lower hierarchy tier, hierarchy tier 204, which becomes the new current hierarchy tier. Node 1231 is discovered next, and after exhausting the branch (subtree) under node 1231 (if any), the traversal proceeds laterally in hierarchy tier 204, although remaining within the subtree beneath node 1221. Node 1232 is a peer of node 1231 (e.g., same hierarchy tier) and is discovered next. After exhausting the branch (subtree) under node 1232 (if any), the traversal returns to node 1221. Because, in this scenario 200a, request 104 is limited to node 1221 and its subtree, the traversal of data set 120 is now complete.

FIG. 2B illustrates a traversal scenario 200b that is slightly different than traversal scenario 200a. In traversal scenario 200b, traversal (indicated by the dotted line) at the highest hierarchy tier of request 104 (e.g., hierarchy tier 202) includes multiple peer nodes in the highest hierarchy tier. For example, request 104 may be to count all employees at the company level represented by node 1221 plus all employees below that level. As in FIG. 2A, node 1221 is discovered first, and query manager 110 determines that request 104 is permitted for node 1221 and its subtree. The traversal proceeds downward to the next lower hierarchy tier, hierarchy tier 204, similarly as described for traversal scenario 200a.

However, because, in this scenario 200b, request 104 includes peers of node 1221 and their subtrees, the traversal is not complete. From node 1221, the traversal proceeds laterally to node 1222, a peer of node 1221. The traversal recurses downward to exhaust the subtree under node 1222, picking up nodes 1233 and 1234, similarly to the traversal described for nodes 1231 and 1232. After exhausting the subtrees under both nodes 1221 and 1222, the traversal is complete.

FIG. 2C illustrates a traversal scenario 200c that is slightly different than traversal scenario 200b. In traversal scenario 200c, traversal (indicated by the dotted line) at the highest hierarchy tier of request 104 (e.g., hierarchy tier 202) includes multiple peer nodes in the highest hierarchy tier—similar to traversal scenario 200b. And, request 104 may be similar, to count all employees at the company level represented by node 1222 plus all employees below that level. As in FIG. 2B, node 1221 is discovered first.

However, in traversal scenario 200c, query manager 110 determines that request 104 is not permitted for node 1221 and its subtree. Thus the traversal omits any nodes hierarchically below node 1221 from the traversal (which would otherwise be a downward recursion to exhaust the subtree under node 1221). From node 1221, the traversal proceeds laterally to node 1222, and query manager 110 determines that request 104 is permitted for node 1222 and its subtree. The traversal recurses downward to exhaust the subtree under node 1222, picking up nodes 1233 and 1234, and is complete.

FIG. 3A illustrates generation of set filters 3241 and 3231, using policies 160 and filter construction 146. Set filter 3241 is set filter 180 for node 1241; set filter 3242 is set filter 180 for node 1242; and set filter 3231 is set filter 180 for node 1231. Set filters 323 and 324 are intermediate stages, as described below. For this example, a Bloom filter architecture is used, although some examples may use cuckoo filters or another type of set filter that returns an indication of whether an element is a member of a set.

Figure 3B:
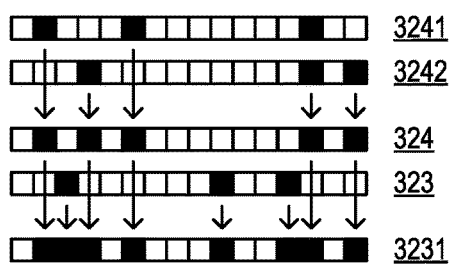
Figure 3C:
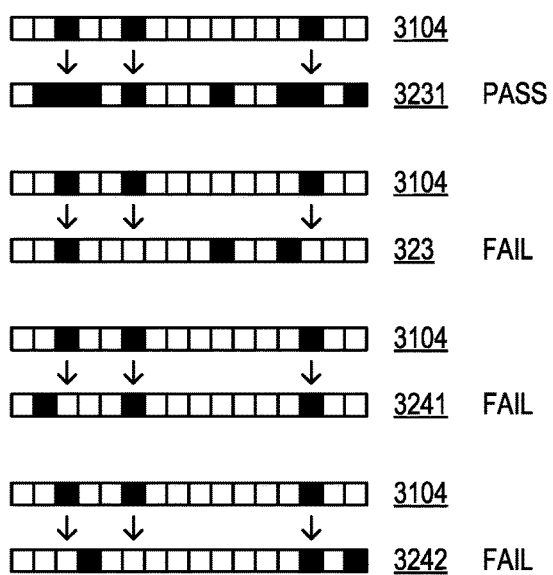
FIG. 3C illustrate use of the example set filters of FIGS. 3A and 3B.

The set filters of FIGS. 3A-3C are bit fields, with empty boxes representing a bit value and a filled box representing a 1 bit value. Thus, set filter 3241 is {0,1,0,0,0,1,0,0,0,0,0,0,0,1,0,0}; set filter 3242 is {0,0,0,1,0,0,0,0,0,0,0,0,0,1,0,1}; set filter 324 is {0,1,0,1,0,1,0,0,0,0,0,0,0,1,0,1}; set filter 323 is {0,0,1,0,0,0,0,0,0,1,0,0,1,0,0,0}; and set filter 3231 is {0,1,1,1,0,1,0,0,0,1,0,0,1,1,0,1}.

Set filter 3241 is generated by passing specific policies of policies 160 (e.g., excluding public flag 162) through a one-way filter bank 346 in filter construction 146. The one-way functions may each be hash functions or an equivalent. The one-way function results are mapped to bits of bit fields, turning a select bit (corresponding to the output of a one-way function) from a zero to a 1. In a hierarchical structure, Bloom filters are built from the lowest hierarchy tier, upward.

In this example, node 1241 is at the lowest hierarchy tier (a hierarchy tier 302), so set filter 3241 does not use any set filters from a lower hierarchy tier. Set filter 3242 is constructed similarly for node 1242, using specific policies of policies 160 for node 1242. Node 1231, which is a parent node for nodes 1241 and 1242, is at the next higher hierarchy tier (a hierarchy tier 304). As a result, set filter 3231 will use set filters 3241 and 3242 from lower hierarchy tier 302, in addition to using specific policies of policies 160 for node 1231.

Set filter 323 is constructed for node 1231, similarly to the way set filter 3241 was constructed for node 1241. Set filters 3241 and 3242 are combined using a bitwise- or operation into set filter 324. This is seen most readily in FIG. 3B. The filled boxes (representing 1's) in set filter 324 are filled in if the corresponding box in either set filter 3241 or set filter 3242 is filled in. This combination (set filter 324) is then further combined with the intermediate result set filter 323 into set filter 3231. This further combination is also a bitwise-or operation. The filled boxes (representing 1's) in set filter 3231 are filled in if the correspond box in either set filter 323 or set filter 324 is filled in. This process recurses upward through data set 120 until a set filter is created for node 1211.

FIG. 3C illustrates how set filters are used to return a positive or negative result. A query value 3104 for request 104 is {0,1,0,0,0,1,0,0,0,0,0,0,1,0,0}. In some examples, query value 3104 is generated by passing identity 105 (or a proxy for identity 105) through one-way filter bank 346, and mapping the one-way function results to a bit field, similarly to generating set filters 3241, 3242, and 323.

A bit-wise test is performed. If all bits that are set to 1 in query value 3104 have corresponding bits that are set to 1 in the tested set filter, a positive result is returned. Otherwise, if even a single bit that is set to 1 in query value 3104 corresponds to a bit that is set to 0 in the tested set filter, a negative result is returned.

In the example of FIG. 3C, the test of query value 3104 against set filter 3231 passes, returning a positive result. However, the tests of query value 3104 against set filters 3241 and 3242 fail, returning a negative result. Additionally, the test of query value 3104 against set filter 323 (which is specific to node 1231 and does not include the subtree under node 123) also fails. This indicates that the test of query value 3104 against set filter 3231 may be returning a false positive result.

Figure 4:
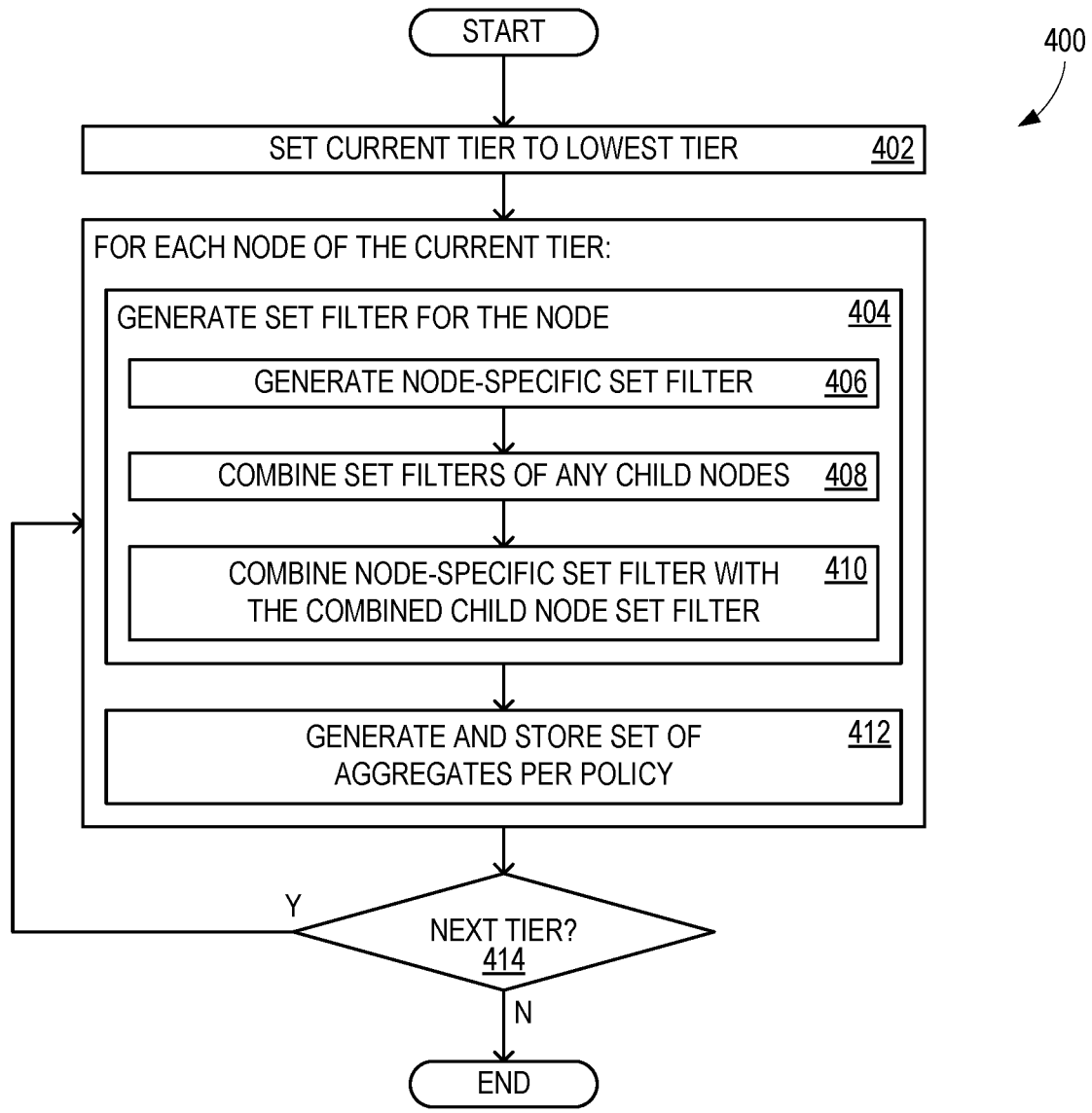
FIG. 4 shows a flowchart illustrating exemplary operations that may be performed in conjunction with the generation of set filters as illustrated in FIG. 3A.

FIG. 4 shows a flowchart 400 illustrating exemplary operations that may be performed in conjunction with the generation of the set filters, as illustrated in FIG. 3A. In some examples, operations described for flowchart 400 are performed by computing device 800 of FIG. 8. Flowchart 400 describes a process that traverses data set 120 from the lowest hierarchy tier up through the highest hierarchy tier, commencing with operation 402 that sets the current (working) hierarchy tier set to the lowest hierarchy tier.

Operation 404 is performed for each node of the current tier, and generates a set filter 180 for each node, based on at least a specific policy of the node (e.g., policy 164 of policies 160). Operation 404 uses operations 406-410. Operation 406 generates a set filter for the node itself (e.g., set filter 323), and operation 408 combines set filters for any child nodes having the current node as a common parent (e.g., into set filter 324). Operation 410 combines the results of operations 106 and 406 (e.g., combines set filters 323 and 324 into set filter 3231). That is, operation 410 combines the set filter of the node at the current tier with a combined set filter for any child nodes of the node at the current tier. In some examples, combining set filters comprises performing a bitwise-or operation.

In some examples, if the size renders storage feasible, operation 412 generates and stores a set of aggregates (e.g., set of aggregates 176) for each combination of policies the each node. For examples using such sets of aggregates, operation 412 may also be performed for each node of the current tier.

While there remains a hierarchy tier above the current tier, flowchart 400 moves upward to the higher hierarchy tier. Decision operation 414 determines whether there is a next higher tier, and if so, flowchart 400 continues the recursion with the hierarchy tier above the current tier set to the (new) current hierarchy tier. Otherwise, flowchart 400 concludes.

FIGS. 5A, 5B, 5C, and 5D show flowcharts 500a, 500b, 500c, and 500d, respectively, illustrating exemplary operations that may be performed balancing traversals and pre-computations for data set 120 using examples of architecture 100. In some examples, operations described for flowcharts 500a-500d are performed by computing device 800 of FIG. 8.

Figure 5A:
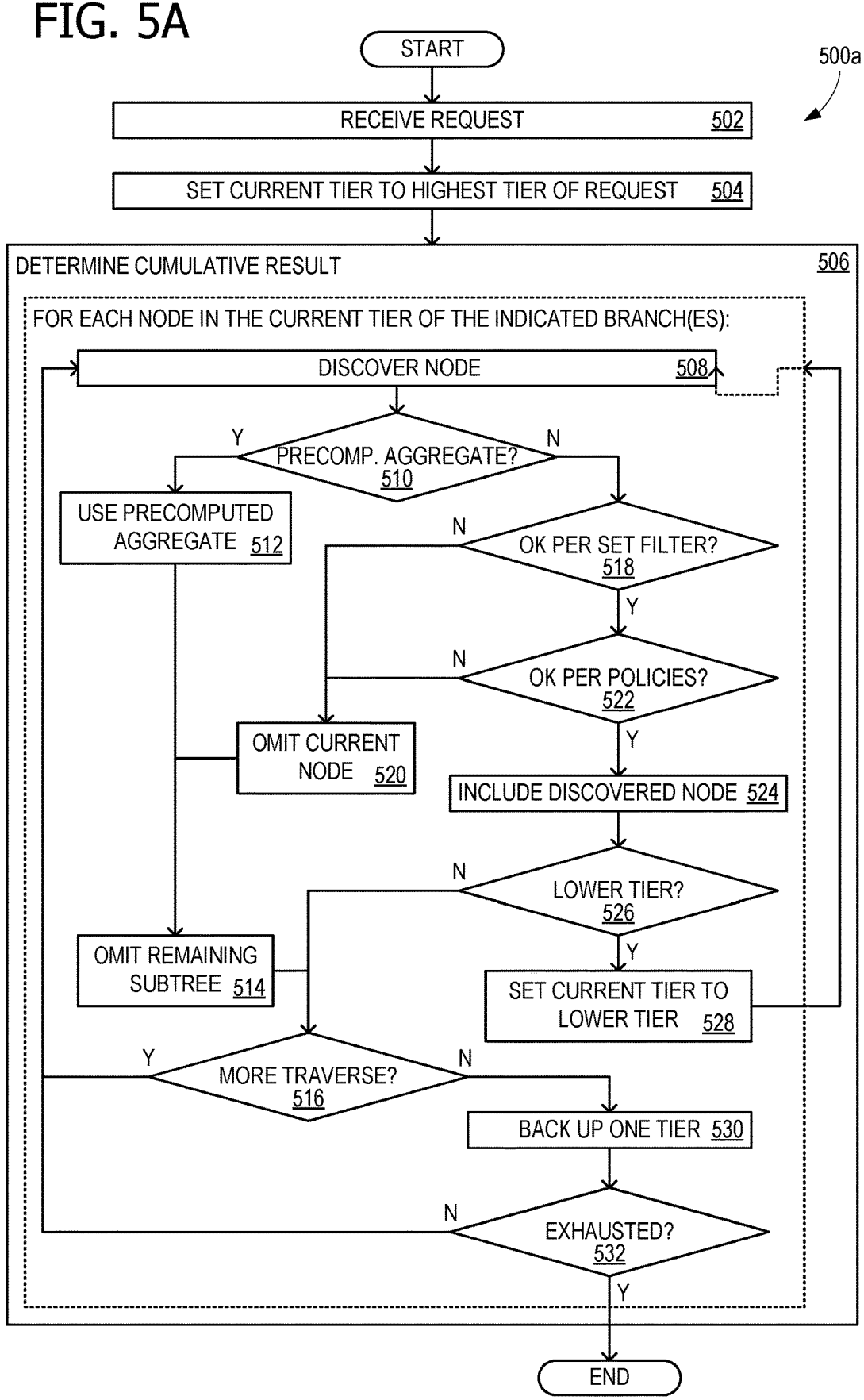
FIGS. 5A-5D show flowcharts illustrating exemplary operations that may be performed balancing traversals and precomputations for distributed data sets using examples of the architecture of FIG. 1.

Flowchart 500a in FIG. 5A is used when set filter 180 is used for a quick negative answer, but positive results (indications that request 104 is permitted) are verified using policies 160 (e.g., policy 164 is not used in the determination), and precomputed aggregates are used to avoid traversing some portions of data set 120. Request 104 is received in operation 502 for a commutative operation on connected data set 120 (that is subject to access control). In some examples, the commutative operation comprises an operation selected from the list consisting of: count, sum, collect, union, intersection, average, percentiles, minimum, and maximum.

Operation 504 sets the current tier to a highest hierarchy tier of request 104, and operation 506 determines cumulative result 118. The process for determining cumulative result 118 recurses downwardly through data set 120, starting with the current hierarchy tier set in operation 504. Request 104 will indicate a particular subset (e.g., branch or subtree) of data set 120, or else may indicate the entirety of data set 120. Operations 508-532 are performed for each discoverable node in each branch that the process reaches, starting with the location within data set 120 indicated by request 104.

Operation 508 traverses the current hierarchy tier laterally to discover nodes. In some examples, traversing the current hierarchy tier laterally at the highest hierarchy tier of request 104 comprises traversing only nodes identified in request 104. In some examples, the traversal reaches only a single node in the highest hierarchy tier (see FIG. 2A), whereas in some examples, the traversal reaches multiple peer nodes in the highest hierarchy (see FIGS. 2B and 2C).

At each discovered node in the current hierarchy tier, decision operation 510 determines whether the discovered node has a precomputed aggregate of the requested operation (e.g., a relevant value in precomputed aggregates 170, such as precomputed aggregate 172 or a relevant value in set of aggregates 176). If so, flowchart 500a moves to operation 512 to, based on at least determining that the discovered node has a precomputed aggregate, including the precomputed aggregate of the discovered node in cumulative result 118.

Flowchart 500a then moves to operation 514 to omit any nodes hierarchically below the discovered node from the recursion. Decision operation 516 determines whether there are additional peer nodes (e.g., nodes within the current branch) within the current tier to traverse. If so, flowchart 500*a* returns to operation 508. If not, flowchart 500*a* moves to operation 530, which is described below.

If, however, decision operation 510 determines that the discovered node does not have a precomputed aggregate of the requested operation, flowchart 500*a* moves to decision operation 518. Based on at least determining that the discovered node does not have a precomputed aggregate, decision operation 518 determines whether set filter 180 of the discovered node indicates that request 104 is permitted for the discovered node.

If set filter 180 indicates that request 104 is not permitted for the discovered node, then based at least on set filter 180 of the discovered node indicating that request 104 is not permitted for the discovered node, operation 520 omits the discovered node from cumulative result 118 Operation 514 then includes, based on at least set filter 180 of the discovered node indicating that request 104 is not permitted for the discovered node, omitting any nodes hierarchically below the discovered node from the recursion.

In some examples, set filter 180 provides probabilistic positive results, and thus a positive result is verified using policies 160. In some examples, set filter 180 comprises a filter selected from the list consisting of: a Bloom filter and a cuckoo filter. Thus, in flowchart 500*a*, when decision operation 518 returns a positive results, decision operation 522 determining whether a policy (e.g., policy 164 of policies 160) of the discovered node permits request 104 for the discovered node.

If the positive result of decision operation 518 had been a false positive, decision operation 522 returns a negative result and operation 520 includes, based on at least determining that the policy of the discovered node does not permit request 104 for the discovered node, omitting any nodes hierarchically below the discovered node from the recursion. Otherwise, operation 524 includes the discovered node in cumulative result 118.

In some examples (e.g., examples of flowchart 500*a* and flowchart 500*b*, described below), including the discovered node in cumulative result 118 comprises including the discovered node in cumulative result 118 based on at least determining that the policy of the discovered node permits request 104 for the discovered node and also determining that set filter 180 of the discovered node indicates that request 104 is permitted for the discovered node.

Decision operation 526 determines whether there is a lower tier to continue the recursive operation. If so, operation 528 sets the current tier to the lower tier and moves back to operation 508 to continue the recursion to any new current hierarchy tier below the discovered node. If not, flowchart 500*a* moves to decision operation 516. If there are any more peer nodes to traverse in current branch of the current tier, flowchart 500*a* returns to operation 508 as described above (and without changing the current tier).

However, if there are no more peer nodes in the current branch, this branch (subtree) of data set 120 has been exhausted, and flowchart 500*a* moves to operation 530 to go back upward a tier, so that operation 508 will look for peer nodes at that tier. That is, operation 530 sets the new current tier to a higher tier. Decision operation 532 determines whether it is possible to go up another tier, or whether that would set the current tier outside data set 120 or beyond the scope of request 104. If not, flowchart 500*a* returns to operation 508 to recurse through additional branches (if any). If however, if request 104 has been exhausted (e.g., the scope of request 104 has already been addressed by the traversals thus far), as determined by decision operation 532, flowchart 500*a* is complete.

Figure 5B:
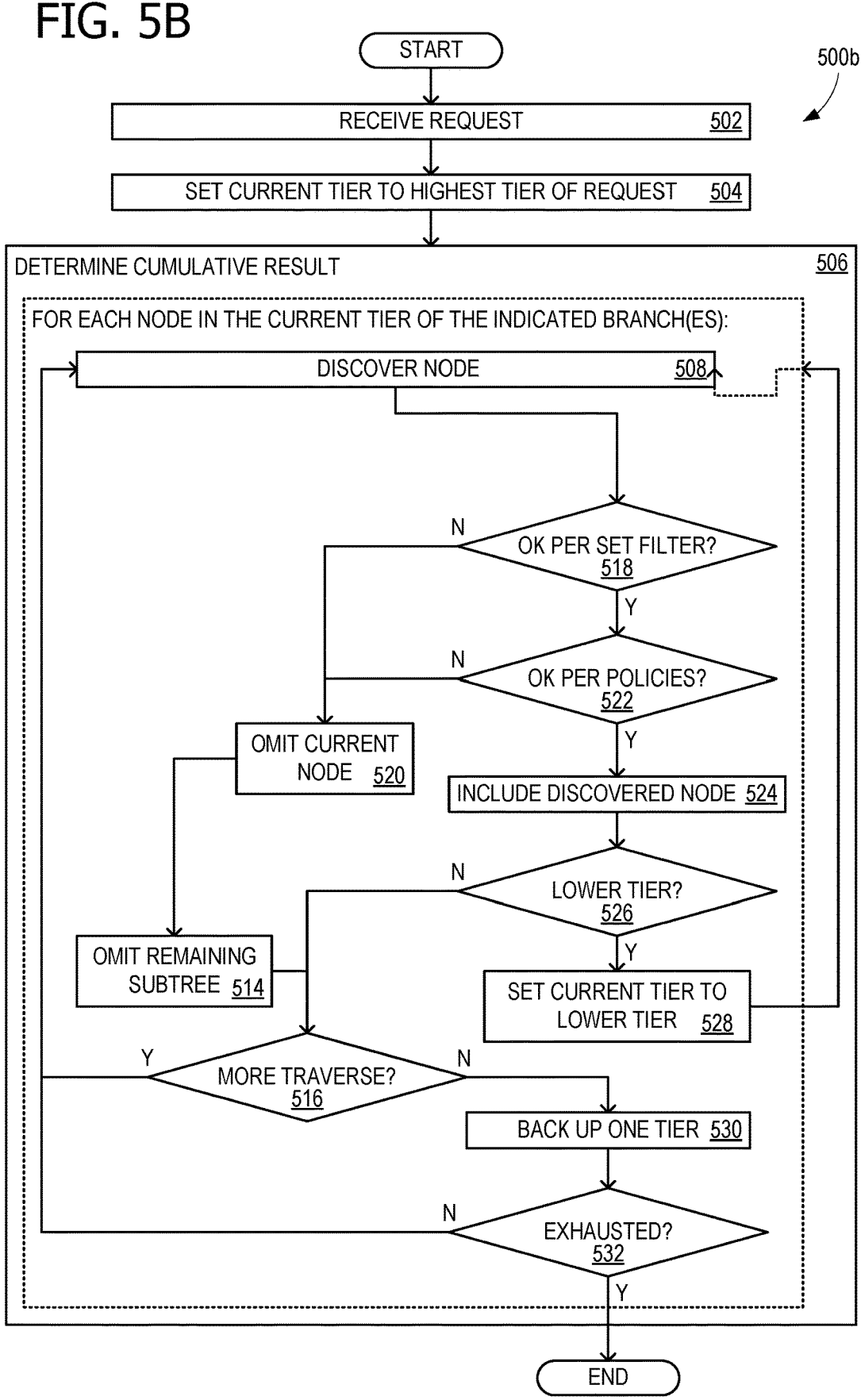

Flowchart 500*b* in FIG. 5B is used when set filter 180 is used for a quick negative answer, but positive results (e.g., indications that request 104 is permitted) are verified using policies 160 (the same as in flowchart 500*a*), but precomputed aggregates are not used. In flowchart 500*b*, decision operation 510 and operation 512 are deleted, and decision operation 518 follows operation 508 directly.

Figure 5C:
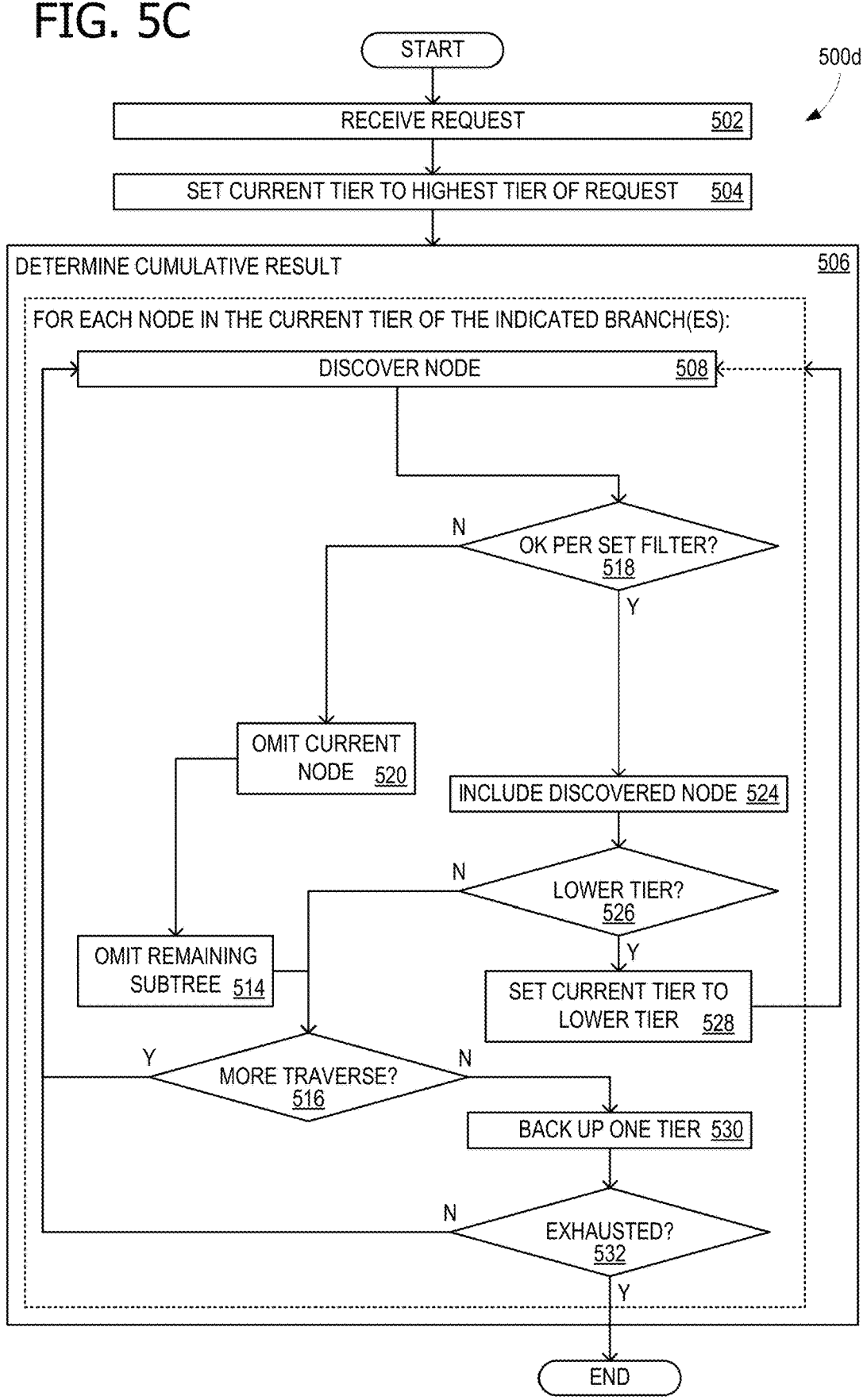

Flowchart 500*c* in FIG. 5C is used when set filter 180 in each node is used for a final determination of whether request 104 is permitted (e.g., policies 160 is not used in the determination), and precomputed aggregates are used (the same as in flowchart 500*a*) to avoid traversing some portions of data set 120. In flowchart 500*c*, decision operation 522 is deleted, and operation 524 follows a positive result of decision operation 518 directly.

The use of set filter 180 as a final determination may occur when set filter 180 provides a definitive positive result as opposed to a probabilistic positive result, or when the false positive rate is sufficiently low (e.g., below some threshold) that the organization's risk tolerance accepts the consequences of false positives. In some examples (e.g., examples of flowchart 500*c* and flowchart 500*d*, described below), including the discovered node in cumulative result 118 comprises including the discovered node in cumulative result 118 based on at least determining that the policy of the discovered node permits request 104 for the discovered node—but without using policies 160.

Figure 5D:
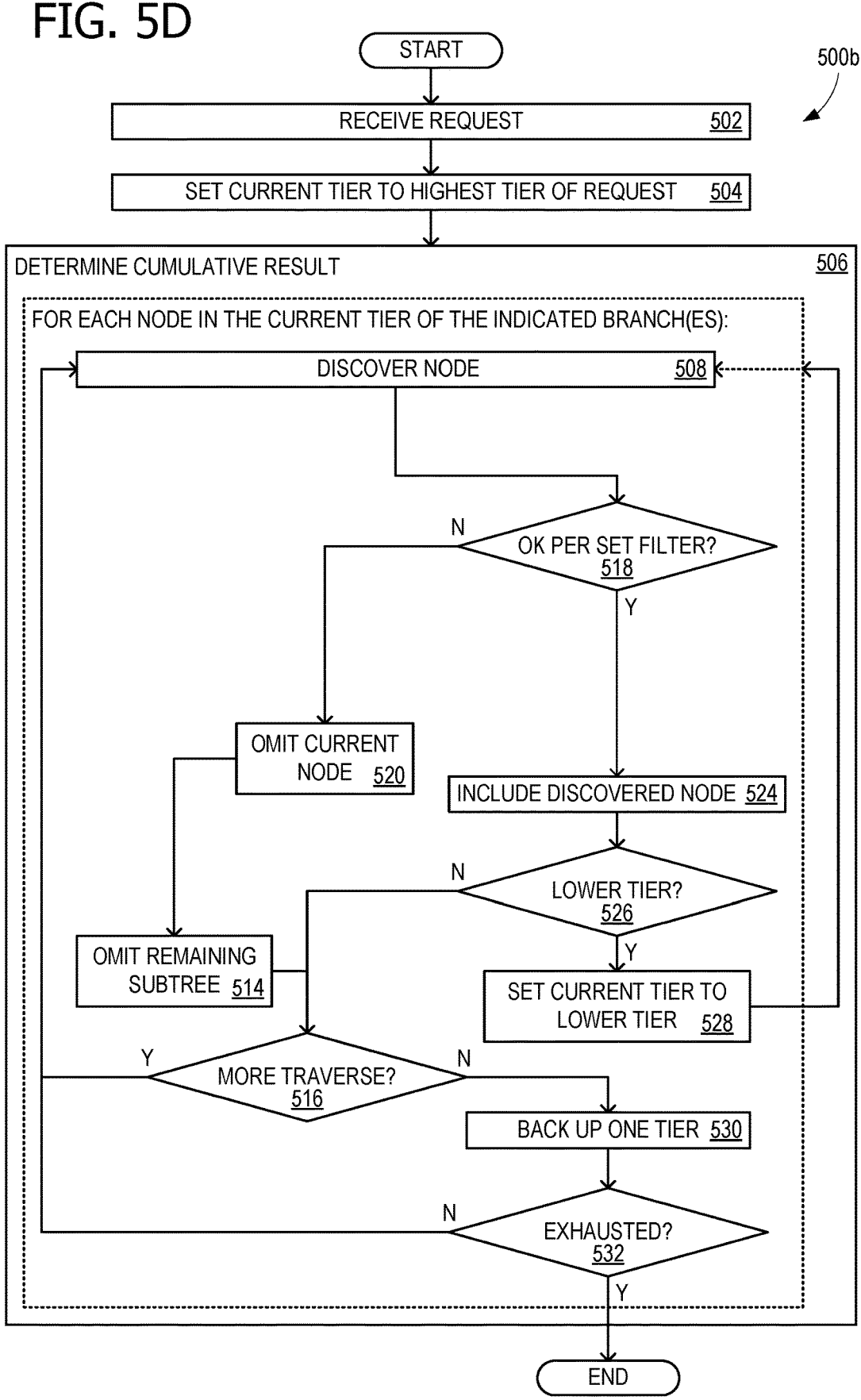

Flowchart 500*d* in FIG. 5D is used when set filter 180 in each node is used as the final answer for whether request 104 is permitted (e.g., policies 160 is not used in the determination), and no precomputed aggregates are used. In flowchart 500*d*, decision operations 510 and 522, and operation 512, are deleted. Decision operation 518 follows operation 508 directly, and operation 524 follows a positive result of decision operation 518 directly.

Figure 6:
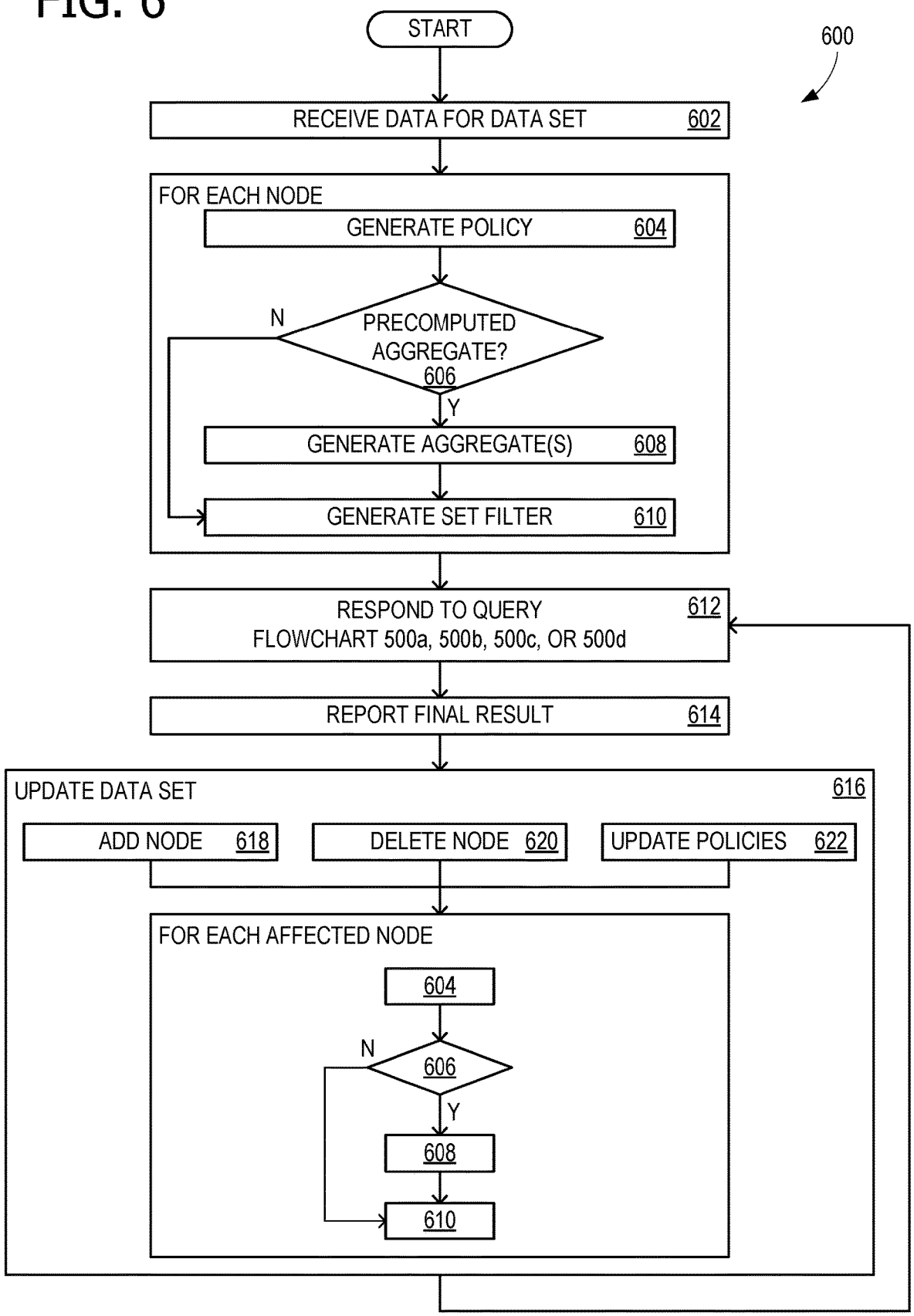
FIG. 6 shows a flowchart illustrating exemplary operations that may be performed when using examples of the architecture of FIG. 1.

FIG. 6 shows a flowchart 600 illustrating exemplary operations that may be performed by architecture 100. In some examples, operations described for flowchart 600 are performed by computing device 800 of FIG. 8. Flowchart 600 commences with receiving data for nodes and relationships of data set 120 in operation 602. In some examples, data set 120 comprises nodes and relationships between nodes, has an acyclic structure, and/or comprises an acyclic graph. In some examples, data set 120 comprises a hierarchical data set distributed across a plurality of disparate geographic regions. In some examples, data set 120 has a tree structure.

Operations 604-610 prepare set for querying with request 104. Operation 604 generates policies 160 for each node, and decision operation 606 determines whether a node is permitted to have a precomputed aggregate. If so, then based on at least determining that a node is permitted to have a precomputed aggregate, operation 608 computes precomputed aggregates 170. Otherwise, operation 608 is skipped. Operation 610 generates set filter 180 for each node, as described above in relation to FIGS. 3 and 4 (flowchart 400). Operations 604-610 are performed prior to receiving request 104, and may also be performed later, when updating data set 120 in operation 616 (as described below).

Operation 612 responds to a query (e.g., request 104) according to one of flowcharts 500*a*, 500*b*, 500*c*, or 500*d*, based on the options selected for data set 120 (e.g., whether precomputed aggregates 170 are used and whether set filter 180 is trusted for positive results). Operation 614 reports final result 108, based on at least cumulative result 118. In some examples, operation 614 reports cumulative result 118 as final result 108. In some examples, operation 614 also includes further processing of cumulative result 118, reporting final result 108.

Data set 120 is updated in operation 616, for example by adding a node (or relationship) in operation 618, deleting a node (or relationship) in operation 620, and/or updating policies 160 for one or more nodes of data set 120. Operations 604-610 are performed for each affected node, such as the nodes hierarchically above the added, deleted, or changed node.

When deleting a node, in some scenarios, if updating set filters 180 will take a long time or more computing resources than desired or available, the set filter updates may be postponed until a more convenient time. This will result in a higher false positive rate that could otherwise be achieved with the set filter configuration. So there is a balance between tolerating the higher false positive result and expending the computing resources and time to update the set filters.

Traditional Bloom filters do not support deletions because one-way functions (e.g., hash functions) are lossy and irreversible. Thus, deletion of a node requires rebuilding all Bloom set filters above hierarchically above the deleted node. Cuckoo filters, however, do support deletions, although do also return probabilistic positive results.

Figure 7:
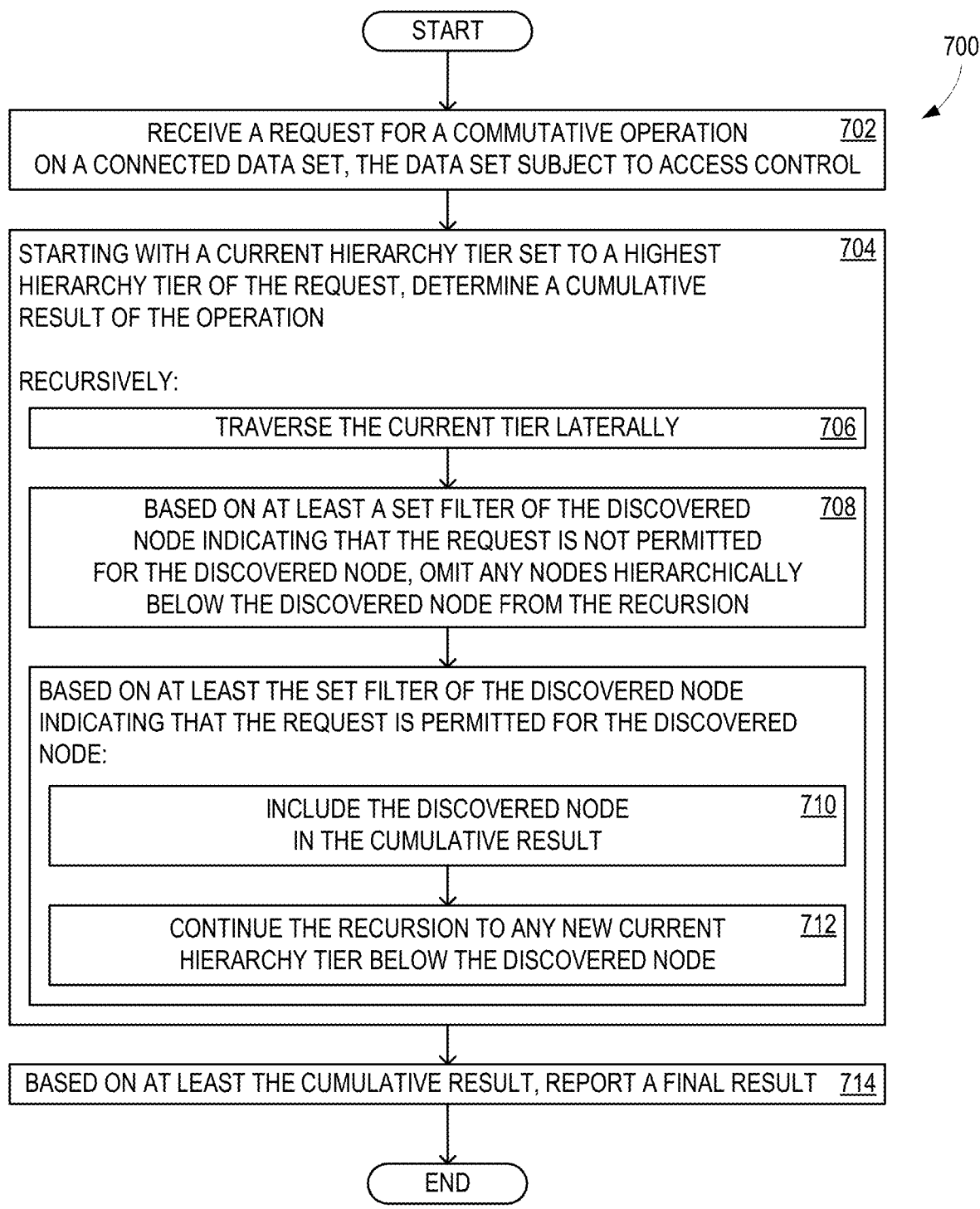
FIG. 7 shows another flowchart illustrating exemplary operations that may occur when using examples of the architecture of FIG. 1.

FIG. 7 shows a flowchart 700 illustrating exemplary operations that may be performed by architecture 100. In some examples, operations described for flowchart 700 are performed by computing device 800 of FIG. 8. Flowchart 700 commences with operation 702, which includes receiving a request for a commutative operation on a connected data set that is subject to access control. Operation 704 includes, starting with a current hierarchy tier set to a highest hierarchy tier of the request, determining a cumulative result of the operation.

Operation 704 recursively (e.g., downwardly) performs operations 706-712, traversing the current hierarchy tier laterally. Operation 706 traverses the current hierarchy tier laterally and operation 708 includes, based on at least a set filter of the discovered node indicating that the request is not permitted for the discovered node, omitting any nodes hierarchically below the discovered node from the recursion. Operations 710 and 712 are performed based on at least the set filter of the discovered node indicating that the request is permitted for the discovered node. Operation 710 includes the discovered node in the cumulative result and operation 712 continues the recursion to any new current hierarchy tier below the discovered node. Operation 714 includes, based on at least the cumulative result, reporting a final result.

Additional Examples

A system comprises: a processor; and a computer-readable medium storing instructions that are operative upon execution by the processor to: receive a request for a commutative operation on a connected data set, the data set subject to access control; starting with a current hierarchy tier set to a highest hierarchy tier of the request, determine a cumulative result of the operation, wherein determining the cumulative result comprises recursively: traversing the current hierarchy tier laterally and, at each discovered node in the current hierarchy tier: based on at least a set filter of the discovered node indicating that the request is not permitted for the discovered node, omitting any nodes hierarchically below the discovered node from the recursion; and based on at least the set filter of the discovered node indicating that the request is permitted for the discovered node: including the discovered node in the cumulative result; and continuing the recursion to any new current hierarchy tier below the discovered node; and based on at least the cumulative result, report a final result.

An example computerized method comprises: receiving a request for a commutative operation on a connected data set, the data set subject to access control; starting with a current hierarchy tier set to a highest hierarchy tier of the request, determining a cumulative result of the operation, wherein determining the cumulative result comprises recursively: traversing the current hierarchy tier laterally and, at each discovered node in the current hierarchy tier: based on at least a set filter of the discovered node indicating that the request is not permitted for the discovered node, omitting any nodes hierarchically below the discovered node from the recursion; and based on at least the set filter of the discovered node indicating that the request is permitted for the discovered node: including the discovered node in the cumulative result; and continuing the recursion to any new current hierarchy tier below the discovered node; and based on at least the cumulative result, reporting a final result.

One or more example computer storage devices has computer-executable instructions stored thereon, which, on execution by a computer, cause the computer to perform operations comprising: receiving a request for a commutative operation on a connected data set, the data set subject to access control; starting with a current hierarchy tier set to a highest hierarchy tier of the request, determining a cumulative result of the operation, wherein determining the cumulative result comprises recursively: traversing the current hierarchy tier laterally and, at each discovered node in the current hierarchy tier: based on at least a set filter of the discovered node indicating that the request is not permitted for the discovered node, omitting any nodes hierarchically below the discovered node from the recursion; and based on at least the set filter of the discovered node indicating that the request is permitted for the discovered node: including the discovered node in the cumulative result; and continuing the recursion to any new current hierarchy tier below the discovered node; and based on at least the cumulative result, reporting a final result.

Alternatively, or in addition to the other examples described herein, examples include any combination of the following:
  at each discovered node, determining whether the discovered node has a precomputed aggregate of the requested operation;
  based on at least determining that the discovered node has a precomputed aggregate, including the precomputed aggregate of the discovered node in the cumulative result;
  based on at least determining that the discovered node has a precomputed aggregate, omitting any nodes hierarchically below the discovered node from the recursion;
  based on at least determining that the discovered node does not have a precomputed aggregate, determining whether the set filter of the discovered node indicates that the request is permitted for the discovered node;
  prior to receiving the request for the commutative operation on the connected data set, computing the precomputed aggregates;
  determining whether a policy of the discovered node permits the request for the discovered node;
  based on at least determining that the policy of the discovered node does not permit the request for the discovered node, omitting any nodes hierarchically below the discovered node from the recursion;

including the discovered node in the cumulative result comprises including the discovered node in the cumulative result based on at least determining that the policy of the discovered node permits the request for the discovered node;

the set filter provides probabilistic positive results;

the set filter comprises a filter selected from the list consisting of: a Bloom filter and a cuckoo filter;

the data set comprises a hierarchical data set distributed across a plurality of disparate geographic regions;

starting with a second current hierarchy tier set to a lowest hierarchy tier of the data set, recursively: for each node at the second current tier, generating a set filter based on at least a policy of the node at the second current tier; and combining the set filter of the node at the second current tier with a combined set filter for any child nodes of the node at the second current tier;

while there remains a hierarchy tier above the second current tier, combining set filters of nodes at the second current tier having a common parent;

while there remains a hierarchy tier above the second current tier, continuing the recursion with the hierarchy tier above the second current tier set to the second current hierarchy tier;

the data set has a tree structure;

the data set has an acyclic structure;

the data set comprises an acyclic graph;

the data set comprises nodes and relationships between nodes;

the commutative operation comprises an operation selected from the list consisting of: count, sum, collect, union, intersection, average, percentiles, minimum, and maximum;

generating the policy for each node;

traversing the current hierarchy tier laterally at the highest hierarchy tier of the request comprises traversing only a single node in the highest hierarchy tier of the request;

traversing the current hierarchy tier laterally at the highest hierarchy tier of the request comprises traversing multiple peer nodes in the highest hierarchy tier;

determining whether the set filter of the discovered node indicates that the request is permitted for the discovered node;

determining whether a node is permitted to have a precomputed aggregate;

based on at least determining that a node is permitted to have a precomputed aggregate, computing the precomputed aggregate;

based at least on the set filter of the discovered node indicating that the request is not permitted for the discovered node, omitting the discovered node from the cumulative result;

including the discovered node in the cumulative result comprises including the discovered node in the cumulative result based on at least determining that the policy of the discovered node permits the request for the discovered node and determining that the set filter of the discovered node indicates that the request is permitted for the discovered node;

combining set filters comprises performing a bitwise-or operation; and storing a set of aggregates for each combination of policies at each node.

While the aspects of the disclosure have been described in terms of various examples with their associated operations, a person skilled in the art would appreciate that a combination of operations from any number of different examples is also within scope of the aspects of the disclosure.

Example Operating Environment

Figure 8:
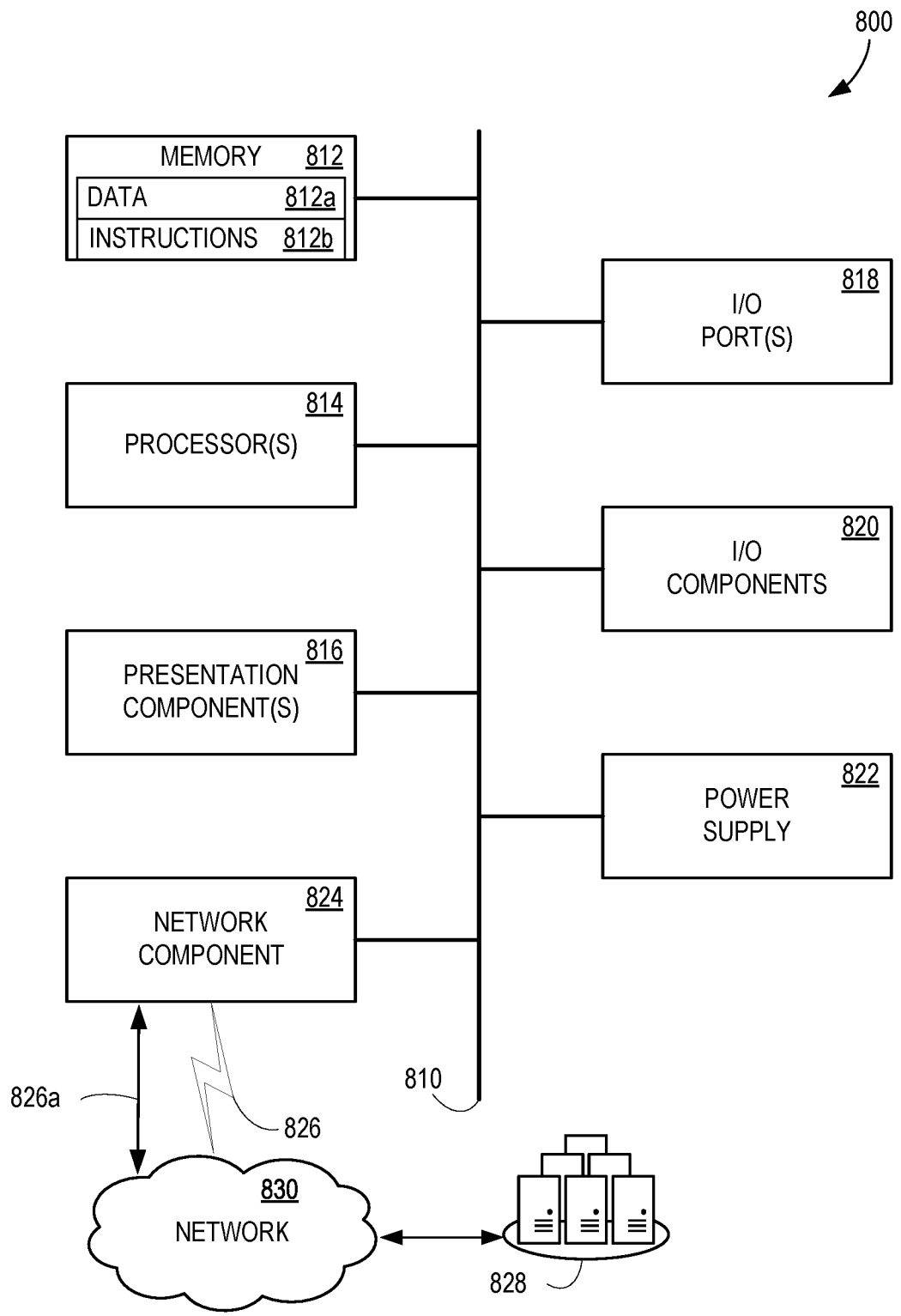
FIG. 8 shows a block diagram of an example computing device suitable for implementing some of the various examples disclosed herein.

FIG. 8 is a block diagram of an example computing device 800 for implementing aspects disclosed herein, and is designated generally as computing device 800. In some examples, one or more computing devices 800 are provided for an on-premises computing solution. In some examples, one or more computing devices 800 are provided as a cloud computing solution. In some examples, a combination of on-premises and cloud computing solutions are used. Computing device 800 is but one example of a suitable computing environment and is not intended to suggest any limitation as to the scope of use or functionality of the examples disclosed herein, whether used singly or as part of a larger set.

Neither should computing device 800 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 800 includes a bus 810 that directly or indirectly couples the following devices: computer storage memory 812, one or more processors 814, one or more presentation components 816, input/output (I/O) ports 818, I/O components 820, a power supply 822, and a network component 824. While computing device 800 is depicted as a seemingly single device, multiple computing devices 800 may work together and share the depicted device resources. For example, memory 812 may be distributed across multiple devices, and processor(s) 814 may be housed with different devices.

Bus 810 represents what may be one or more busses (such as an address bus, data bus, or a combination thereof). Although the various blocks of FIG. 8 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 8 and the references herein to a "computing device." Memory 812 may take the form of the computer storage media referenced below and operatively provide storage of computer-readable instructions, data structures, program modules and other data for the computing device 800. In some examples, memory 812 stores one or more of an operating system, a universal application platform, or other program modules and program data. Memory 812 is thus able to store and access data 812a and instructions 812*b* that are executable by processor 814 and configured to carry out the various operations disclosed herein.

In some examples, memory 812 includes computer storage media. Memory 812 may include any quantity of memory associated with or accessible by the computing device 800. Memory 812 may be internal to the computing device 800 (as shown in FIG. 8), external to the computing device 800 (not shown), or both (not shown). Additionally, or alternatively, the memory 812 may be distributed across multiple computing devices 800, for example, in a virtualized environment in which instruction processing is carried out on multiple computing devices 800. For the purposes of this disclosure, "computer storage media," "computer-storage memory," "memory," and "memory devices" are synonymous terms for the computer-storage memory 812, and none of these terms include carrier waves or propagating signaling.

Processor(s) 814 may include any quantity of processing units that read data from various entities, such as memory 812 or I/O components 820. Specifically, processor(s) 814 are programmed to execute computer-executable instructions for implementing aspects of the disclosure. The instructions may be performed by the processor, by multiple processors within the computing device 800, or by a processor external to the client computing device 800. In some examples, the processor(s) 814 are programmed to execute instructions such as those illustrated in the flow charts discussed below and depicted in the accompanying drawings. Moreover, in some examples, the processor(s) 814 represent an implementation of analog techniques to perform the operations described herein. For example, the operations may be performed by an analog client computing device 800 and/or a digital client computing device 800. Presentation component(s) 816 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 800, across a wired connection, or in other ways. I/O ports 818 allow computing device 800 to be logically coupled to other devices including I/O components 820, some of which may be built in. Example I/O components 820 include, for example but without limitation, a microphone, joystick, game pad, satellite dish, scanner, printer, wireless device, etc.

Computing device 800 may operate in a networked environment via the network component 824 using logical connections to one or more remote computers. In some examples, the network component 824 includes a network interface card and/or computer-executable instructions (e.g., a driver) for operating the network interface card. Communication between the computing device 800 and other devices may occur using any protocol or mechanism over any wired or wireless connection. In some examples, network component 824 is operable to communicate data over public, private, or hybrid (public and private) using a transfer protocol, between devices wirelessly using short range communication technologies (e.g., near-field communication (NFC), Bluetooth branded communications, or the like), or a combination thereof. Network component 824 communicates over wireless communication link 826 and/or a wired communication link 826*a* to a remote resource 828 (e.g., a cloud resource) across network 830. Various different examples of communication links 826 and 826*a* include a wireless connection, a wired connection, and/or a dedicated link, and in some examples, at least a portion is routed through the internet.

Although described in connection with an example computing device 800, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor; and
   a computer-readable medium storing instructions that are operative upon execution by the processor to:
     receive a request for a commutative operation on a connected data set, the data set being subject to access control;
     starting with a current hierarchy tier set to a highest hierarchy tier of the request, determine a cumulative result of the operation, wherein determining the cumulative result comprises recursively:
       traversing the current hierarchy tier laterally and, at each discovered node in the current hierarchy tier:
         based on at least a set filter of the discovered node indicating that the request is not permitted for the discovered node, omitting any nodes hierarchically below the discovered node from the recursion; and
         based on at least the set filter of the discovered node indicating that the request is permitted for the discovered node:
           including the discovered node in the cumulative result; and
           continuing the recursion to any new current hierarchy tier below the discovered node; and
     based on at least the cumulative result, report a final result.

2. The system of claim 1, wherein the instructions are further operative to, at each discovered node:
   determine whether the discovered node has a precomputed aggregate of the requested operation;
   based on at least determining that the discovered node has a precomputed aggregate:
     include the precomputed aggregate of the discovered node in the cumulative result; and
     omit any nodes hierarchically below the discovered node from the recursion; and
   based on at least determining that the discovered node does not have a precomputed aggregate, determine whether the set filter of the discovered node indicates that the request is permitted for the discovered node.

3. The system of claim 2, wherein the instructions are further operative to:
   prior to receiving the request for the commutative operation on the connected data set, compute the precomputed aggregates.

4. The system of claim 1, wherein the instructions are further operative to:
   determine whether a policy of the discovered node permits the request for the discovered node;
   based on at least determining that the policy of the discovered node does not permit the request for the discovered node, omit any nodes hierarchically below the discovered node from the recursion; and
   wherein including the discovered node in the cumulative result comprises including the discovered node in the cumulative result based on at least determining that the policy of the discovered node permits the request for the discovered node.

5. The system of claim 1,
   wherein the set filter provides probabilistic positive results; or
   the set filter comprises a filter selected from the list consisting of:
     a Bloom filter and a cuckoo filter.

6. The system of claim 1, wherein the data set comprises a hierarchical data set distributed across a plurality of disparate geographic regions.

7. The system of claim 1, wherein the instructions are further operative to:
   starting with a second current hierarchy tier set to a lowest hierarchy tier of the data set, recursively:
     for each node at the second current tier, generate a set filter based on at least a policy of the node at the second current tier;
     combine the set filter of the node at the second current tier with a combined set filter for any child nodes of the node at the second current tier; and
     while there remains a hierarchy tier above the second current tier:
       combine set filters of nodes at the second current tier having a common parent; and
       continue the recursion with the hierarchy tier above the second current tier set to the second current hierarchy tier.

8. A computerized method comprising:
   receiving a request for a commutative operation on a connected data set, the data set being subject to access control;
   starting with a current hierarchy tier set to a highest hierarchy tier of the request, determining a cumulative result of the operation, wherein determining the cumulative result comprises recursively:
     traversing the current hierarchy tier laterally and, at each discovered node in the current hierarchy tier:

based on at least a set filter of the discovered node indicating that the request is not permitted for the discovered node, omitting any nodes hierarchically below the discovered node from the recursion; and based on at least the set filter of the discovered node indicating that the request is permitted for the discovered node:

including the discovered node in the cumulative result; and continuing the recursion to any new current hierarchy tier below the discovered node; and based on at least the cumulative result, reporting a final result.

9. The method of claim 8, further comprising, at each discovered node:

determining whether the discovered node has a precomputed aggregate of the requested operation;

based on at least determining that the discovered node has a precomputed aggregate:

including the precomputed aggregate of the discovered node in the cumulative result; and omitting any nodes hierarchically below the discovered node from the recursion; and based on at least determining that the discovered node does not have a precomputed aggregate, determining whether the set filter of the discovered node indicates that the request is permitted for the discovered node.

10. The method of claim 9, further comprising:

prior to receiving the request for the commutative operation on the connected data set, computing the precomputed aggregates.

11. The method of claim 8, further comprising:

determining whether a policy of the discovered node permits the request for the discovered node;

based on at least determining that the policy of the discovered node does not permit the request for the discovered node, omitting any nodes hierarchically below the discovered node from the recursion; and wherein including the discovered node in the cumulative result comprises including the discovered node in the cumulative result based on at least determining that the policy of the discovered node permits the request for the discovered node.

12. The method of claim 8, wherein the set filter provides probabilistic positive results; or the set filter comprises a filter selected from the list consisting of:

a Bloom filter and a cuckoo filter.

13. The method of claim 8, wherein the data set comprises a hierarchical data set distributed across a plurality of disparate geographic regions.

14. The method of claim 8, further comprising:

starting with a second current hierarchy tier set to a lowest hierarchy tier of the data set, recursively:

for each node at the second current tier, generating a set filter based on at least a policy of the node at the second current tier;

combining the set filter of the node at the second current tier with a combined set filter for any child nodes of the node at the second current tier; and while there remains a hierarchy tier above the second current tier:

combining set filters of nodes at the second current tier having a common parent; and continuing the recursion with the hierarchy tier above the second current tier set to the second current hierarchy tier.

15. One or more computer storage devices having computer-executable instructions stored thereon, which, on execution by a computer, cause the computer to perform operations comprising:

receiving a request for a commutative operation on a connected data set, the data set being subject to access control;

starting with a current hierarchy tier set to a highest hierarchy tier of the request, determining a cumulative result of the operation, wherein determining the cumulative result comprises recursively:

traversing the current hierarchy tier laterally and, at each discovered node in the current hierarchy tier:

based on at least a set filter of the discovered node indicating that the request is not permitted for the discovered node, omitting any nodes hierarchically below the discovered node from the recursion; and based on at least the set filter of the discovered node indicating that the request is permitted for the discovered node:

including the discovered node in the cumulative result; and continuing the recursion to any new current hierarchy tier below the discovered node; and based on at least the cumulative result, reporting a final result.

16. The one or more computer storage devices of claim 15, wherein the operations further comprise, at each discovered node:

determining whether the discovered node has a precomputed aggregate of the requested operation;

based on at least determining that the discovered node has a precomputed aggregate:

including the precomputed aggregate of the discovered node in the cumulative result; and omitting any nodes hierarchically below the discovered node from the recursion; and based on at least determining that the discovered node does not have a precomputed aggregate, determining whether the set filter of the discovered node indicates that the request is permitted for the discovered node.

17. The one or more computer storage devices of claim 16, wherein the operations further comprise:

prior to receiving the request for the commutative operation on the connected data set, computing the precomputed aggregates.

18. The one or more computer storage devices of claim 15, wherein the operations further comprise:

determining whether a policy of the discovered node permits the request for the discovered node;

based on at least determining that the policy of the discovered node does not permit the request for the discovered node, omitting any nodes hierarchically below the discovered node from the recursion; and wherein including the discovered node in the cumulative result comprises including the discovered node in the cumulative result based on at least determining that the policy of the discovered node permits the request for the discovered node.

19. The one or more computer storage devices of claim 15, wherein the set filter provides probabilistic positive results; or the set filter comprises a filter selected from the list consisting of:
a Bloom filter and a cuckoo filter.

20. The one or more computer storage devices of claim 15, wherein the operations further comprise:
starting with a second current hierarchy tier set to a lowest hierarchy tier of the data set, recursively:
for each node at the second current tier, generating a set filter based on at least a policy of the node at the second current tier;
combining the set filter of the node at the second current tier with a combined set filter for any child nodes of the node at the second current tier; and
while there remains a hierarchy tier above the second current tier:
combining set filters of nodes at the second current tier having a common parent; and
continuing the recursion with the hierarchy tier above the second current tier set to the second current hierarchy tier.

\* \* \* \* \*